(12) United States Patent
Inoue et al.

(10) Patent No.: US 8,835,076 B2
(45) Date of Patent: Sep. 16, 2014

(54) ELECTROLYTE MEMBRANE AND FUEL CELL USING THE SAME

(75) Inventors: Kyojiro Inoue, Toyota (JP); Shinya Takeshita, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 468 days.

(21) Appl. No.: 12/667,049

(22) PCT Filed: Jun. 30, 2008

(86) PCT No.: PCT/JP2008/062240
§ 371 (c)(1),
(2), (4) Date: Dec. 29, 2009

(87) PCT Pub. No.: WO2009/005156
PCT Pub. Date: Jan. 8, 2009

(65) Prior Publication Data
US 2010/0196787 A1 Aug. 5, 2010

(30) Foreign Application Priority Data
Jul. 2, 2007 (JP) ................................. 2007-174123

(51) Int. Cl.
*H01M 8/10* (2006.01)
*H01M 8/04* (2006.01)

(52) U.S. Cl.
CPC .. *H01M 8/04119* (2013.01); *H01M 2300/0088* (2013.01); *H01M 8/1058* (2013.01); *H01M 2300/0082* (2013.01); *Y02E 60/521* (2013.01); *H01M 8/1067* (2013.01)
USPC ........... 429/483; 429/479; 429/491; 429/492; 429/493; 429/494; 429/304

(58) Field of Classification Search
None
See application file for complete search history.

(56) References Cited

U.S. PATENT DOCUMENTS

| 5,795,668 | A  | * | 8/1998  | Banerjee ........................ 429/492 |
| 5,998,057 | A  | * | 12/1999 | Koschany et al. ............. 429/475 |
| 6,355,370 | B2 | * | 3/2002  | Katoh et al. ................... 429/494 |
| 2005/0095486 | A1 | * | 5/2005  | Hamamoto et al. ............ 429/33 |
| 2005/0186461 | A1 | * | 8/2005  | Hommura et al. ............. 429/33 |
| 2005/0227132 | A1 | * | 10/2005 | Hori et al. ...................... 429/30 |

(Continued)

FOREIGN PATENT DOCUMENTS

| CN | 1774829 | 5/2006 |
| EP | 1 615 282 A1 | 1/2006 |

(Continued)

*Primary Examiner* — Jeffrey Wollschlager
(74) *Attorney, Agent, or Firm* — Finnegan, Henderson, Farabow, Garrett & Dunner, LLP

(57) ABSTRACT

In a fuel cell 1 including a membrane electrode assembly 2 which includes a reinforcing-membrane-type electrolyte membrane 10A, a dry-up on the anode side is suppressed by actively forming a water content gradient in the electrolyte membrane to enhance water back-diffusion effect from the cathode side to the anode side. For that purpose, two sheets of expanded porous membranes 12a and 12b having different porosities are buried, as reinforcing membranes, in electrolyte resin 11 to obtain the reinforcing-membrane-type electrolyte membrane 10A. The reinforcing-membrane-type electrolyte membrane 10A is used to form the membrane electrode assembly 2, which is sandwiched by separators 20 and 30 such that the side of a reinforcing membrane 12b with a larger porosity becomes the cathode side, thus obtaining the fuel cell 1. When one sheet of the reinforcing membrane is buried, the reinforcing membrane is offset to the anode side to be buried in the electrolyte resin.

1 Claim, 5 Drawing Sheets

(56) References Cited

U.S. PATENT DOCUMENTS

| | | | |
|---|---|---|---|
| 2006/0068258 A1* | 3/2006 | Kinoshita | 429/33 |
| 2006/0159973 A1* | 7/2006 | Kotera et al. | 429/33 |
| 2007/0287051 A1 | 12/2007 | Onuma et al. | |

FOREIGN PATENT DOCUMENTS

| JP | 6-231782 | 8/1994 |
|---|---|---|
| JP | 8-259710 | 10/1996 |
| JP | 9-194609 | 7/1997 |
| JP | 2004-185882 | 7/2004 |
| JP | 2005-216769 | 8/2005 |
| JP | 2005-302526 | 10/2005 |
| JP | 2005-310612 | 11/2005 |
| JP | 2005-310697 | 11/2005 |
| JP | 2006-147425 | 6/2006 |
| JP | 2007-115415 | 5/2007 |
| JP | 2007-157637 | 6/2007 |
| JP | 2007-265898 | 10/2007 |
| JP | 2007-329015 | 12/2007 |
| WO | WO 2004/093228 A1 | 10/2004 |

* cited by examiner

FIG. 2
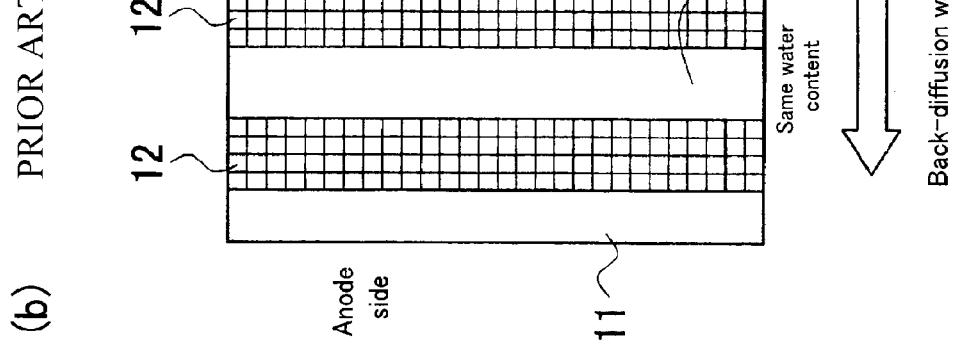
(a)
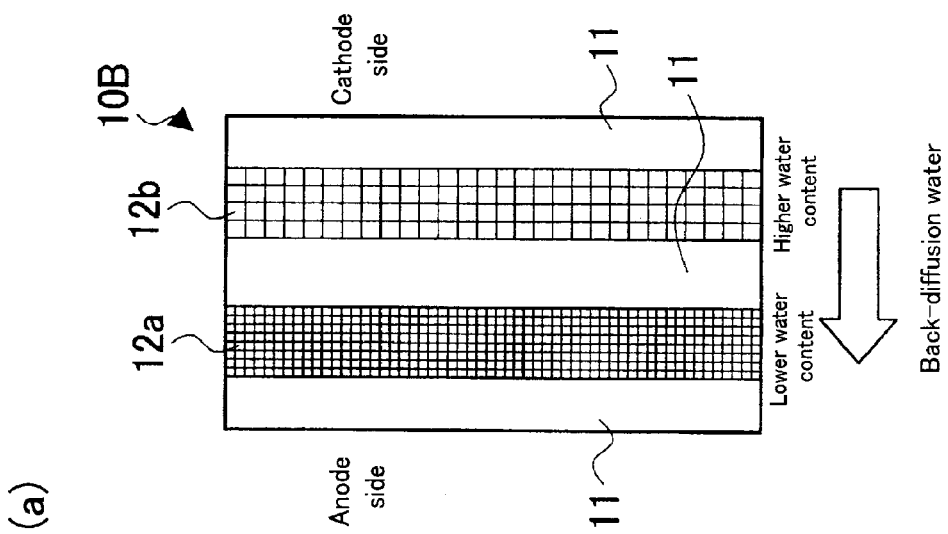
(b) PRIOR ART

FIG. 4
(a)
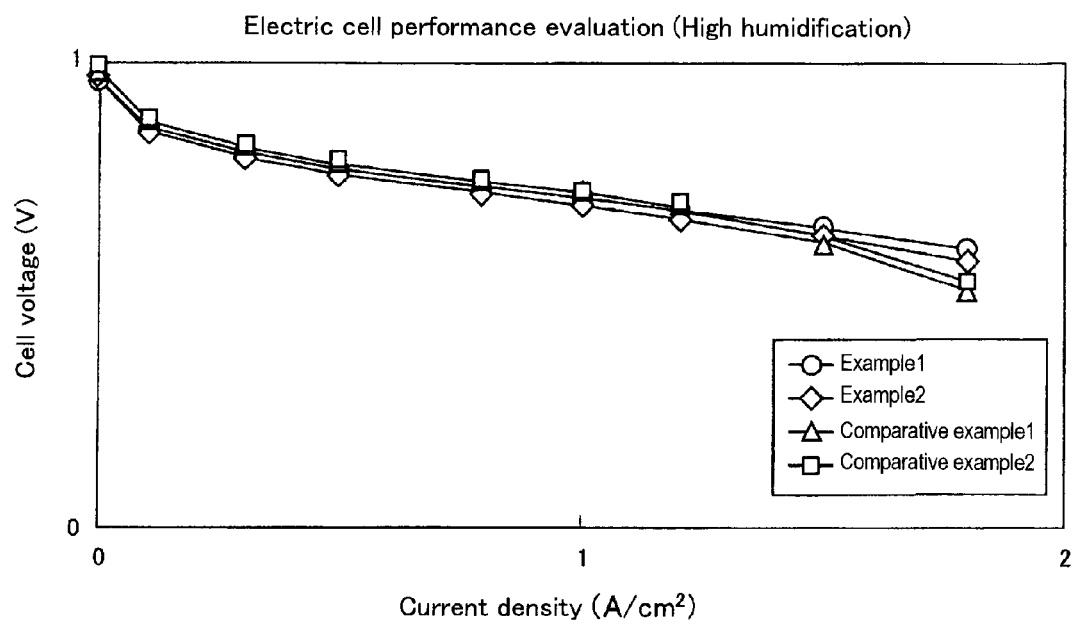
(b)
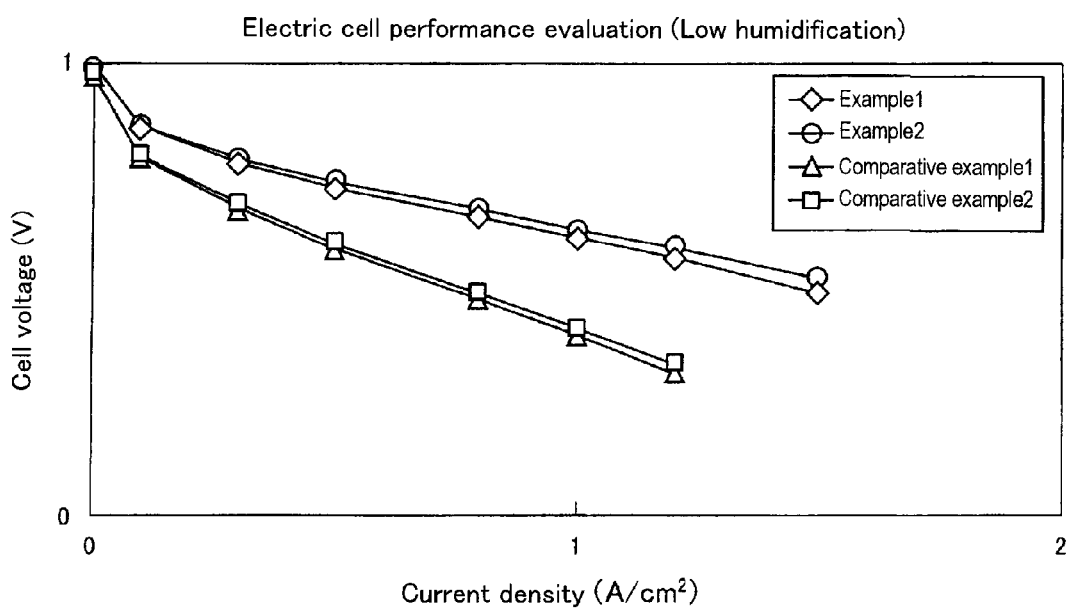

ELECTROLYTE MEMBRANE AND FUEL CELL USING THE SAME

CROSS-REFERENCE TO RELATED APPLICATIONS

This application is a national phase application of International Application No. PCT/JP2008/062240, filed Jun. 30, 2008, and claims the priority of Japanese Application No. 2007-174123, filed Jul. 2, 2007, the contents of both of which are incorporated herein by reference.

TECHNICAL FIELD

The present invention relates to an electrolyte membrane for a fuel cell, and a fuel cell including the same.

BACKGROUND ART

As a type of fuel cell, a polymer-electrolyte fuel cell (PEFC) is known. Compared with other types of fuel cells, a PEFC has a lower operating temperature (about −30 to 120° C.) and potential for reductions in cost and size, and therefore is expected to be a power source for automobiles, and others.

As shown in FIG. 5, a PEFC 1 is configured such that a membrane electrode assembly (MEA) 2, which is a principal component, is sandwiched by an anode-side separator 20, which includes a fuel (hydrogen) gas channel 21, and a cathode-side separator 30, which includes an air (oxygen) channel 31, to form a fuel cell 1 called as a single cell. The membrane electrode assembly 2 has a structure in which an anode-side electrode 15a, which is made up of a catalyst layer 13a and a gas diffusion layer 14a of anode side, is laminated on one side of a polymer electrolyte membrane 10 which is an ion exchange membrane, and on the other side thereof, a cathode-side electrode 15b, which is made up of a catalyst layer 13b and a gas diffusion layer 14b of cathode side, is laminated.

In a PEFC, a thin membrane of perfluorosulfonic acid polymer (Nafion® membrane, DuPont, USA), which is a fluorine-based electrolyte resin (ion exchange resin), is mainly used as the electrolyte membrane (see Patent Document 1 etc.) Moreover, since a thin membrane made up of an electrolyte resin alone does not provide enough strength, a reinforcing-membrane-type electrolyte membrane is used, in which an expanded porous reinforcing membrane (for example, a thin membrane formed by expanded PTFE or polyolefin resin, etc.) is impregnated with an electrolyte resin dissolved in a solvent and dried (Patent Document 2 and Patent Document 3, etc.)

Moreover, a fluorine-based electrolyte resin used in a PEFC exhibits a proton conductivity when it contains water. The proton conductivity varies depending on the amount of water content such that the lower the water content, the lower the proton conductivity. On the other hand, in fuel cells of recent years, for the purpose of system simplification and cost reduction, there is growing need for the operation at lower humidification levels; however, an operation at a low humidification level will lead to a decline of proton conductivity, which will result in a significant reduction in the power generation performance compared with at a high humidification level.

That is, in an operation at a low humidification level, an electroendosmosis occurs in which water moves toward the cathode side along with the movement of protons, and the anode side of the fuel cell gets drier. When the anode side becomes dry, the proton conductivity of the electrolyte of the anode side decreases and also the resistance of the entire cell increases, leading to a significant decline in the cell performance. To prevent such drying of anode side, attempts have been made to utilize a water back-diffusion effect, in which the product water generated by the proton oxidation reaction at the cathode side is effectively moved to the anode side, thereby preventing a performance decline in a low humidification state.

In general, decreasing the film thickness of the electrolyte membrane will reduce the moving distance of water back-diffusion, and also increase the concentration gradient of water between the dry anode side and the wet cathode side, thus making it possible to increase the mobility of water so that the product water at the cathode side moves to the anode side as water back-diffusion.

Patent Document 1: JP Patent Publication (Kokai) No. 2001-35510A
Patent Document 2: JP Patent Publication (Kokai) No. 2005-302526A
Patent Document 3: JP Patent Publication (Kokai) No. 2006-202532A

DISCLOSURE OF THE INVENTION

Problems to be Solved by the Invention

As so far described, attempts to cause the product water of the cathode side to move toward the anode-side as water back-diffusion thereby preventing a decline of power generation performance have been made mainly by decreasing the thickness of the electrolyte membrane. However, in the aspects of membrane strength and durability of the cell, the thickness of the electrolyte membrane cannot be significantly reduced and there is a limit about the amount of reduction. As an electrolyte membrane for improving the membrane strength, as described above, a reinforcing-membrane-type electrolyte membrane having an expanded porous membrane as a reinforcing membrane is used; however, because of the presence of the reinforcing membrane, there is still a limit in reducing the membrane thickness and a sufficient water back-diffusion effect cannot be expected.

The present invention has been made in view of the above described circumstances, and its object is to provide a reinforcing-membrane-type electrolyte membrane, which can still exhibit a high water back-diffusion effect while including a reinforcing membrane, and a fuel cell having the same.

Means for Solving the Problems

The present inventors have conducted much research to solve the above described problems and have found that in a conventional reinforcing-membrane-type electrolyte membrane, since the reinforcing membrane, which is an expanded porous membrane, is located at the middle in the thickness direction of the electrolyte membrane, the thicknesses of the electrolyte resin layers formed on both sides of the electrolyte membrane are the same, and the theoretical amount of water absorption of both the electrolyte resin layers are the same so that a water back-diffusion effect more than that attributing solely to the thickness of the reinforcing-membrane-type electrolyte membrane cannot be achieved; however, by actively forming a water absorption gradient in the thickness direction of the reinforcing-membrane-type electrolyte membrane, it becomes possible to impart the reinforcing-type electrolyte membrane with a more water back-diffusion effect than that of conventional level attributing solely to the thickness, thereby eventually completing the invention.

That is, the reinforcing-membrane-type electrolyte membrane according to a first aspect of the present invention is a reinforcing-membrane-type electrolyte membrane in which an expanded porous membrane is buried in an electrolyte resin as a reinforcing membrane, characterized in that the thickness of the electrolyte resin layer formed on one face side of the buried reinforcing membrane is larger than that of an electrolyte resin layer formed on the other face side.

Further, the reinforcing-membrane-type electrolyte membrane according to a second aspect of the present invention is a reinforcing-membrane-type electrolyte membrane in which an expanded porous membrane is buried in an electrolyte resin as a reinforcing membrane, characterized in that the buried reinforcing membrane is made up of multiple sheets of expanded porous membranes with different porosities, and the multiple sheets of expanded porous membranes are arranged in decreasing order of porosity in the thickness direction of the electrolyte membrane.

The fuel cell according to a third aspect of the present invention is a fuel cell in which a membrane electrode assembly is sandwiched by anode-side and cathode-side separators, the membrane electrode assembly being configured such that an electrode is laminated onto each face of the reinforcing-membrane-type electrolyte membrane according to the first aspect, characterized in that the membrane electrode assembly are sandwiched by both the separators such that an electrolyte resin layer of a larger thickness in the reinforcing-membrane-type electrolyte membrane is on the side of the cathode-side separator.

The fuel cell according to a fourth aspect of the present invention is a fuel cell, in which a membrane electrode assembly is sandwiched by anode-side and cathode-side separators, the membrane electrode assembly being configured such that an electrode is laminated onto each face of the reinforcing-membrane-type electrolyte membrane according to the second aspect, characterized in that the membrane electrode assembly is sandwiched by both the separators such that an expanded porous membrane with a largest porosity in the reinforcing-membrane-type electrolyte membrane is on the side of the cathode-side separator.

In the present invention, as the electrolyte resin making up the electrolyte membrane, perfluoro-based polymer electrolyte or carbohydrate-based polymer electrolyte may be appropriately selected for use.

In the present invention, the reinforcing membrane as an expanded porous membrane is, though not limited to, preferably exemplified by polytetrafluoroethylene (PTFE). By controlling the amount of expanding thereof, it is possible to obtain an expanded porous membrane having a desired tensile strength and porosity. A porosity of 50% to 95% is suitable for the impregnation of an electrolyte resin solution.

In the present invention, an electrode is made up of a catalyst layer and a diffusion layer. The catalyst layer is a mixture made up of an electrolyte resin and a conductive material (exemplified by, but not limited to, carbon) carrying a catalyst (exemplified by, though not limited to, platinum), and may be a catalyst layer generally used in fuel cells. The diffusion layer may also be one generally used in fuel cells, and examples may include carbon paper and carbon sheet.

In the present invention, the separators are formed with grooves which make up a fuel channel and an oxidizer channel, and function as current collectors, with one provided with a fuel channel being the anode-side separator and one provided with an oxidizer channel being the cathode-side separator. Either of the separators may be one generally used in fuel cells.

According to the reinforcing-membrane-type electrolyte membrane of the present invention and the fuel cell utilizing the same, compared with a conventional reinforcing-membrane-type electrolyte membrane which has the same thickness and includes a reinforcing membrane in the middle part in the thickness direction, or with a reinforcing-membrane-type electrolyte membrane in which multiple numbers of reinforcing membranes with the same thickness and porosity are arranged in a membrane, it is possible to increase the concentration gradient of water by actively forming a water content gradient in the membrane, in which water content is low at the anode side and is high at the cathode side during power generation. Thereby, a water back-diffusion effect which causes water to move from the cathode-side to the anode-side can be enhanced so that a dry-up which tends to take place in a low humidification operation can be effectively prevented. Moreover, since the capability to absorb the product water produced at the cathode-side catalyst layer will increase, a flooding at the cathode-side electrode which tends to take place during a high humidification operation can be prevented.

Further, as a result of the increase of the water absorbing capability of cathode side in a reinforcing-membrane-type electrolyte membrane, it becomes possible to absorb the product water at the cathode-side catalyst layer during power generation, and freezing of water which tends to take place in a catalyst layer at low temperatures can be prevented. As the result of this, the low-temperature start-up performance of the fuel cell is improved as well.

BRIEF DESCRIPTION OF THE DRAWINGS

FIG. 2(a) is a schematic diagram of a reinforcing-membrane-type electrolyte membrane according a second aspect of the present invention, and FIG. 2(b) is a schematic diagram to illustrate a conventional reinforcing-membrane-type electrolyte membrane which is a contrast to that of FIG. 2(a).

FIG. 4 is a graph to show the power generation performance by fuel cells of Examples and Comparative Examples.

DESCRIPTION OF SYMBOLS

Figure 1:
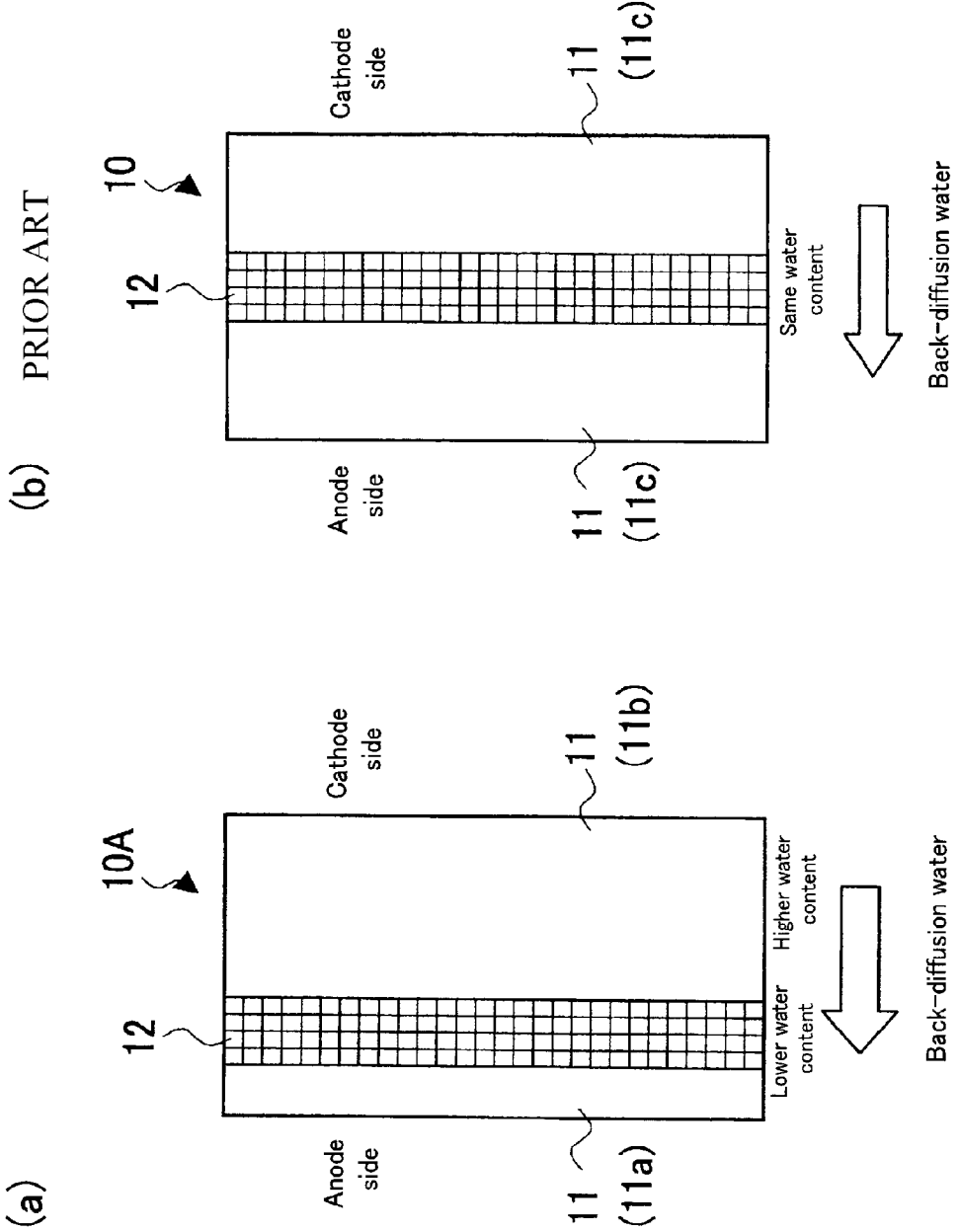
FIG. 1(a) is a schematic diagram of a reinforcing-membrane-type electrolyte membrane according a first aspect of the present invention.
FIG. 1(b) is a schematic diagram to illustrate a conventional reinforcing-membrane-type electrolyte membrane which is a contrast to that of FIG. 1(a).

1 PEFC
2 Membrane electrode assembly (MEA)
10A, 10B Reinforcing-membrane-type electrolyte membrane
11 Electrolyte resin
12, 12a, 12b Reinforcing membrane which is an expanded porous membrane.
13 Catalyst layer
14 Diffusion layer
15a Anode-side electrode
15b Cathode-side electrode
20 Anode-side separator
30 Cathode-side separator

BEST MODE FOR CARRYING OUT THE INVENTION

A reinforcing-membrane-type electrolyte membrane 10A according to the present invention shown in FIG. 1(a) is made up of an electrolyte resin 11 and a sheet of reinforcing membrane 12 which is an expanded porous membrane, and the reinforcing membrane 12 is buried in the electrolyte resin 11 in such a manner to be offset toward one side in the thickness direction of the reinforcing-membrane-type electrolyte membrane 10A. As the result of this, the thickness of an electrolyte resin layer 11b which is formed on one face side (shown as "cathode side" in the figure) of the reinforcing membrane 12 is made larger than that of the electrolyte resin layer 11a formed on the other face side (shown as "anode side" in the figure). Because of this, the water content in the thickness direction of the reinforcing-membrane-type electrolyte membrane 10A is lower at the anode side and higher at the cathode side.

In this regard, in a conventional electrolyte membrane 10 shown in FIG. 1(b), a reinforcing membrane 12 which is an expanded porous membrane is positioned in the middle in the thickness direction. Because of this, the electrolyte resin layers 11c and 11c formed on both sides thereof have equal thicknesses as well as equal water contents.

The reinforcing-membrane-type electrolyte membrane 10B according to the present invention shown in FIG. 2(a) is made up of an electrolyte resin 11 and reinforcing membranes 12a and 12b which are two sheets of expanded porous membranes with different porosities, and the two sheets of reinforcing membranes 12a and 12b are buried in the electrolyte resin 11 with approximately equal spaces in the thickness direction of the reinforcing-membrane-type electrolyte membrane 10B. Further, the reinforcing membrane 12b which is positioned at the cathode side in the figure has a larger porosity than that of the reinforcing membrane 12a positioned at the anode-side in the figure. More electrolyte resin 11 is impregnated into the reinforcing membrane 12b of a larger porosity compared with the reinforcing membrane 12a of a relatively smaller porosity. Because of this, in the reinforcing-membrane-type electrolyte membrane 10B as well, the water content in the thickness direction is lower at the anode side and higher at the cathode side.

In this regard, in the conventional electrolyte membrane 10 shown in FIG. 2(b), reinforcing membranes 12 and 12 which are two sheets of expanded porous membranes with equal porosities, are buried in the electrolyte resin 11 with approximately equal spaces in the thickness direction of the reinforcing-membrane-type electrolyte membrane 10. In this case, the amounts of electrolyte resin 11 to be impregnated into both the reinforcing membranes 12 and 12 are equal to each other, and the water content in the reinforcing-membrane-type electrolyte membrane 10 is approximately the same between at the anode side and at the cathode side.

Figure 3:
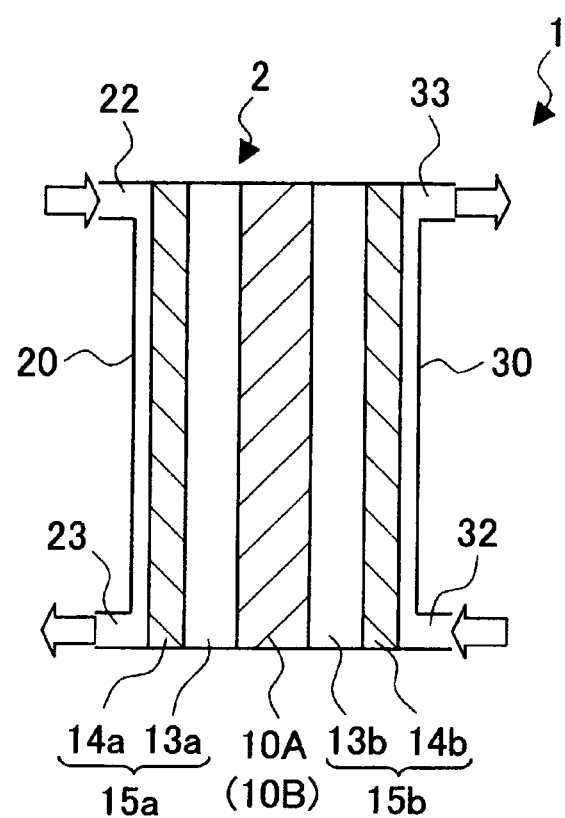
FIG. 3 is a schematic diagram to show an example of the fuel cell according to the present invention.
Figure 5:
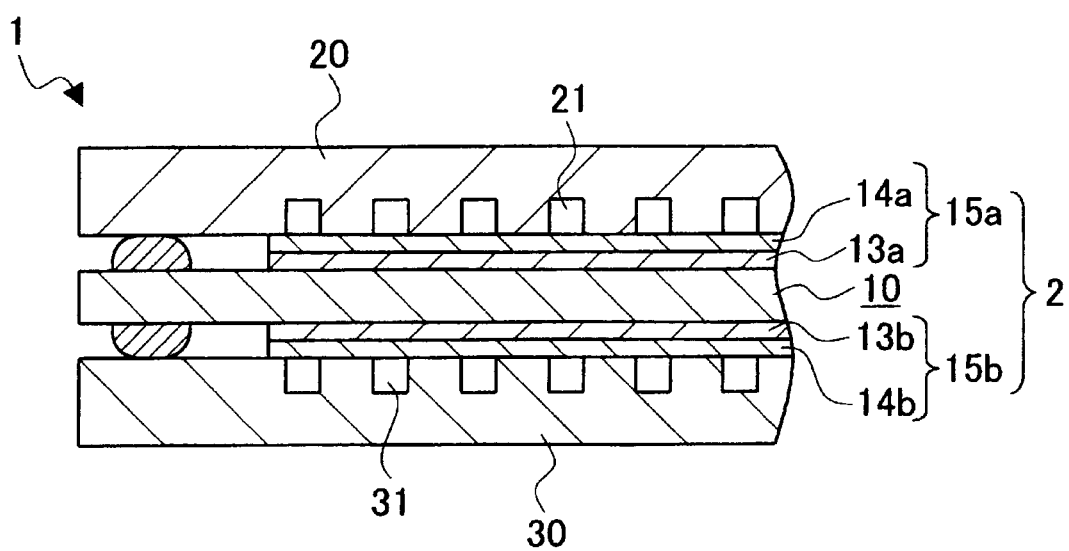
FIG. 5 is a schematic diagram to illustrate a PEFC.

A schematic diagram of a fuel cell 1 which includes the above described reinforcing-membrane-type electrolyte membrane 10A (10B) according to the present invention is shown in FIG. 3. In the fuel cell 1, an anode-side electrode 15a, which is made up of a catalyst layer 13a and a gas diffusion layer 14a of anode side, is laminated onto the side which has been described as the anode side of the reinforcing-membrane-type electrolyte membrane 10A (10B), and a cathode-side electrode 15b, which is made up of a catalyst layer 13b and a gas diffusion layer 14b of cathode side, is laminated onto the side which has been described as the cathode-side to form a membrane electrode assembly 2. The membrane electrode assembly 2 is sandwiched by: an anode-side separator 20 including an inlet 22 and outlet 23 of fuel gas; and a cathode-side separator 30 including an inlet 32 and an outlet 33 of oxidizer, to form a fuel cell 1 as a single cell.

In the fuel cell 1 of the present embodiment, since as described above, the water content is different between at the anode side and at the cathode side of the reinforcing-membrane-type electrolyte membrane 10A (10B), a water content gradient, in which water content is low in the anode side and high in the cathode-side, is formed in the reinforcing-membrane-type electrolyte membrane 10A (10B) during power generation. This will make it possible to increase the concentration gradient of water in the electrolyte membrane, and as the result of which, as shown in FIG. 1(a) and FIG. 2(a), it becomes possible to enhance a water back-diffusion effect which causes water to move from the cathode side to the anode side.

As the result of that, a dry-up of anode side which tends to take place at a low humidification operation can be effectively prevented. Further, since in the cathode side of the reinforcing-membrane-type electrolyte membrane 10A (10B), the capability to absorb the product water produced at the cathode-side catalyst layer 13b will be improved, it is possible to prevent a flooding at the cathode-side electrode 15b, which tends to take place during a high humidification operation. Further, as the result of improvement in the water absorbing capability at the cathode side in the reinforcing-membrane-type electrolyte membrane 10A (10B), it becomes possible to absorb more product water of the cathode-side catalyst layer 13b during power generation, and thereby to prevent a freezing of water in the catalyst layer at low temperatures, and the lower temperature start-up performance of the fuel cell will also be improved.

EXAMPLES

Hereafter, the present invention will be described with reference to Examples and Comparative Examples.

Example 1

(1) PTFE was expanded in two axis directions to prepare a first expanded porous reinforcing membrane 12a of a resin equivalent tensile strength of 200 Mpa and a porosity of 60%, and a second expanded porous reinforcing membrane 12b of a resin equivalent tensile strength of 100 Mpa and a porosity of 80%.

(2) A solution of electrolyte resin ("DE2020", a polymeric solution manufactured by DuPont, whose polymer-chain ends are —$SO_3H$) was poured onto a first porous reinforcing membrane 12a placed on a glass substrate; a second porous reinforcing membrane 12b was placed thereon; and further the aforementioned solution of electrolyte resin was poured thereto. The mixture was dried at 70° C. for 1 hour to obtain a reinforcing-membrane-type electrolyte membrane having a configuration shown in FIG. 2(a) and a thickness of about 30 μm.

Example 2

(1) Expanded porous reinforcing membranes 12a and 12b similar to those of Example 1 were prepared.

(2) Precursor resin of electrolyte resin ("NE111F", a polymer manufactured by DuPont, whose polymer-chain ends are —$SO_2F$) was extruded by an extrusion machine to obtain a thin membrane of a thickness of about 8 μm.

(3) Three sheets of the aforementioned electrolyte resin precursor thin membranes and expanded porous reinforcing membranes 12a and 12b were alternately laminated so as to obtain a layer structure shown in FIG. 2(a), which were subjected to an impregnation treatment at a pressure of 5 kg/cm² under a vacuum environment of 230° C. to obtain a transparent membrane.

(4) The above described transparent membrane was subjected to hydrolysis with a mixed solution of 1 mol/L sodium hydroxide aqueous solution and alcohol, and thereafter polymer-chain ends were converted to an acid group (—$SO_3H$) with 1 mol/L sulfuric acid aqueous solution.

(5) The membrane imparted with ion exchange capability was washed with pure water, and thereafter dried to obtain a reinforcing-membrane-type electrolyte membrane of a thickness of about 30 μm.

Comparative Example 1

(1) PTFE was expanded in two axis directions to prepare two sheets of expanded porous reinforcing membrane of a resin equivalent tensile strength of 100 Mpa and a porosity of 80%.

(2) A solution of electrolyte resin ("DE2020", a polymeric solution manufactured by DuPont, whose polymer-chain ends are —$SO_3H$) was poured onto a porous reinforcing membrane 12 placed on a glass substrate; another sheet of porous reinforcing membrane 12 was placed thereon; and further the aforementioned solution of electrolyte resin was poured thereto. The mixture was dried at 70° C. for 1 hour to obtain a reinforcing-membrane-type electrolyte membrane having a configuration shown in FIG. 2(b) and a thickness of about 30 μm.

Comparative Example 2

(1) Two sheets of expanded porous reinforcing membrane 12 similar to that of Comparative Example 1 were prepared.

(2) A precursor polymer of an electrolyte resin ("NE111F", a polymer manufactured by DuPont, whose polymer-chain ends are —$SO_2F$) was extruded by an extrusion machine to obtain a thin film of a thickness of about 8 μm.

(3) Three sheets of the aforementioned electrolyte resin precursor thin membranes and two sheets of expanded porous reinforcing membranes 12 were alternately laminated so as to be a layer structure shown in FIG. 2(b), which were subjected to an impregnation treatment at a pressure of 5 kg/cm² under a vacuum environment of 230° C. to obtain a transparent membrane.

(4) The above described transparent membrane was subjected to hydrolysis with a mixed solution of 1 mol/L sodium hydroxide aqueous solution and alcohol, and thereafter polymer-chain ends were converted to an acid group (—$SO_3H$) with 1 mol/L sulfuric acid aqueous solution.

(5) The membrane imparted with ion exchange capability was washed with pure water, and thereafter dried to obtain a reinforcing-membrane-type electrolyte membrane of a thickness of about 30 μm.

The same catalyst layer was transferred to each side of the reinforcing-membrane-type electrolyte membranes obtained by Examples 1 and 2, and Comparative Examples 1 and 2 respectively, and the same carbon paper was laminated as a gas diffusion layer to obtain membrane electrode assemblies. Each membrane electrode assembly was sandwiched by anode-side and cathode-side separators such that the side of the reinforcing membrane 12b which has a larger porosity in the reinforcing-membrane-type electrolyte membrane is the side of the cathode-side separator to obtain a fuel cell.

[Test]

A power generation test was conducted at the same condition for the fuel cells of Examples 1 and 2 and Comparative Examples 1 and 2, and the evaluation of electric cell was conducted at both a low humidification condition and a high humidification condition. The results are shown in FIG. 4(a) (high humidification condition) and FIG. 4(b) (low humidification condition).

[Discussion]

As shown in FIGS. 4(a) and 4(b), at the high humidification condition, there were no significant differences between them; however, in a high current region, Comparative Examples 1 and 2 showed a larger decline in the cell voltage compared with Examples 1 and 2. From this result, it is inferred that flooding occurred in Comparative Examples 1 and 2. On the other hand, at the low humidification condition, Examples 1 and 2 showed higher performance than Comparative Examples 1 and 2 in the entire current region. This is considered to be the result of that in Examples 1 and 2, the water movement in the electrolyte membrane, that is the amount of the product water at the cathode side, which moves to the anode side as water back-diffusion, became larger compared with Comparative Examples 1 and 2, thus restricting the drying of the anode side.

From the above described result, it is demonstrated that the present invention can provide a fuel cell of higher performance.

The invention claimed is:

1. A fuel cell, in which a membrane electrode assembly is sandwiched by anode-side and cathode-side separators, said membrane electrode assembly being configured such that an electrode is laminated onto each face of a reinforced electrolyte membrane, the reinforced electrolyte membrane, comprising:
an expanded porous membrane buried in an electrolyte resin as a reinforcing membrane, wherein said buried reinforcing membrane includes multiple sheets of expanded porous membranes comprising a fluorine-based electrolyte resin with different porosities,
wherein said multiple sheets of expanded porous membranes are arranged in decreasing order of porosity in the thickness direction of the reinforced electrolyte membrane between the separators such that the expanded porous membrane sheet with the largest porosity in the reinforced electrolyte membrane is closest to the cathode-side separator.

* * * * *